(12) United States Patent
Petterson et al.

(10) Patent No.: US 6,510,812 B1
(45) Date of Patent: Jan. 28, 2003

(54) METHOD AND A DEVICE FOR MILKING AN ANIMAL

(75) Inventors: Torbjorn Karl Ingemar Petterson, Gnesta (SE); Ingrid Luttenberger, Tumba (SE)

(73) Assignee: DeLaval Holding AB

( * ) Notice: Subject to any disclaimer, the term of this patent is extended or adjusted under 35 U.S.C. 154(b) by 0 days.

(21) Appl. No.: 09/674,788

(22) PCT Filed: May 4, 1999

(86) PCT No.: PCT/SE99/00747
§ 371 (c)(1),
(2), (4) Date: Jan. 4, 2001

(87) PCT Pub. No.: WO99/59399
PCT Pub. Date: Nov. 25, 1999

(30) Foreign Application Priority Data

May 4, 1998  (SE) ............................................... 9801556

(51) Int. Cl.[7] ................................................ A01J 5/00
(52) U.S. Cl. .................................. 119/14.02; 119/14.29
(58) Field of Search ........................... 119/14.02, 14.05, 119/14.07, 14.18, 14.29, 14.3, 14.32, 14.38

(56) References Cited

U.S. PATENT DOCUMENTS

| 5,443,035 | A | * | 8/1995 | Lind et al. ................ | 119/14.02 |
| 5,697,323 | A | * | 12/1997 | Visigalli ................... | 119/14.02 |
| 5,970,910 | A | * | 10/1999 | Grimm et al. ........... | 119/14.02 |
| 6,009,832 | A | * | 1/2000 | Innings et al. ........... | 119/14.02 |
| 6,073,579 | A | * | 6/2000 | Innings et al. ........... | 119/14.02 |

* cited by examiner

Primary Examiner—Peter M. Poon
Assistant Examiner—Son T. Nguyen
(74) Attorney, Agent, or Firm—Hovey Williams LLP

(57) ABSTRACT

The invention relates to a method and a device for milking an animal, which includes at least a pair of teatcups (2). A pulsator (12) is arranged, via a pulsation chamber (4) of each teatcup (2), to subject its liners (3) for a cyclically pulsating pressure from the outside, which pressure has a cycle with a time period T. The cycle includes a first opening phase (a), a second open phase (b), a third closing phase (c) and a fourth closed phase (d). When both the time periods of the second open phase (b) and the fourth closed phase (d) are less than the half time period for the total cycle, T the cyclically pulsating pressures of the respective pulsation chambers are controlled by a control (15) in such a way that a flow of milk between the two teatcups of the respective pair is prevented.

23 Claims, 4 Drawing Sheets

METHOD AND A DEVICE FOR MILKING AN ANIMAL

BACKGROUND OF THE INVENTION

1. Field of the Invention

The invention relates to a method and a device for milking an animal, by the use a milking machine, which comprises at least one pair of teatcups which each comprising a liner for receiving a teat of the animal, wherein these liners internally are subjected to a subpressure for extracting milk from the respective teats, and which comprises a pulsator arranged, via a pulsation chamber of each teatcup, to subject the liners of the teatcup to a cyclically pulsating pressure from the outside, which pressure has a cycle with a time period T, wherein said cycle comprises

- a first opening phase a, which has a first time period $t_a$ and during which the pressure in the pulsation chamber drops from a first pressure level to a second pressure level,
- a second open phase b, which has a second time period $t_b$ and during which the pressure in the pulsation chamber is essentially constant at the second pressure level,
- a third closing phase c, which has a third time period $t_c$ and during which the pressure in the pulsation chamber rises from the second pressure level to the first pressure level,
- a fourth closed phase d, which has a fourth time period $t_d$ and during which the pressure in the pulsation chamber is essentially constant at the first pressure level.

2. Description of the Prior Art

Such methods and devices are previously well known and are used by conventional milking machines. A conventional milking procedure may comprise an initial milking period I, during which the milk flow starts, which period is arranged to stimulate and massage the teat for the purpose of starting the Milk flow. Thereafter, a main milking period II follows and finally a terminating milking period Ill. The initial milking period may according to known technique be performed with a faster pulsation than the main milking period in order to increase the stimulating effect, The most common type of pulsator used has a ratio, i.e. a proportion between an open and a closed position from 70:30 to 60:40. Usually, such a pulsator has two outlets, which give a cyclically pulsating pressure to a pair of teatcups. The cyclically pulsating pressure is phase displaced 180° between these two teatcups, so that an open phase of one of the teatcups essentially occur at the same time as a closed phase of the other teatcup. In such a way it is possible to decrease the fluctuation of the vacuum level of the milking member and use the capacity of the existing milking equipment at maximum. However, since at a stimulating initial milking period has a faster pulsation, the time periods of the open and closed phases decrease while the opening and closing phases have an essentially constant time period, which first of all is determined by the properties of the liner and the air volumes at the pulsation side. Therefore, the opening and closing phases take up a relatively greater part of the time period of the total cycle. It is optimal with a ratio of 50:50 for an open/closed proportion during such an increased pulsation speed. It depends on the fact that, the closed phase will, during the faster pulsation at for example a ratio of 70:30, be very short and possibly not even occur.

A problem, which arises at a ratio of 50:50 and with a phase displacement of 180°, is that an opening phase and a closing phase occur at the same time for a pair of teatcups. This results in a pressure difference and thus an air flow arising between the internal spaces of the two liners, wherein milk in form of droplets may be sucked from one teat via the milk claw and up through the short milk tube leading to the other teatcup and into its liner and there hit the other teats This flow of milk from one teatcup to another is called "cross-flow" and may occur at a very high speed. The droplets may contain bacteria, which may penetrate into the teat canal of the teat and thereby cause infections.

SUMMARY OF THE INVENTION

The object of the present invention is to provide a method and a device which make it possible to avoid the occurrence of a flow of milk between two teatcups, so-called cross-flow, especially in connection with a fast pulsation of a pulsator and with a ratio of about 50:50.

This object is achieved according to the invention by controlling, when both the second $T_b$ and fourth $T_d$ time periods are less than the half time period T for the total cycle, the cyclically pulsating pressures of the respective pulsation chambers in such a way that a flow between the two teatcups of the respective pair is prevented. This control may be performed in several ways, i.e. by a variation of the phase displacement between the two cycles or by a suitable variation of the pulsation speed for the two cycles.

According to a preferred embodiment of the invention, the cyclically pulsating pressures of the respective pulsation chambers are controlled in such a way that the first opening phase of one of the teatcups does not occur at the same time as the third closing phase of the other teatcup. Above all, when these phases coincides, the risk for said flow or milk between the two teatcups occurs. The most practical is that the including cycles have an essentially equal time period with respect to the included phases. Thereby, the cyclically pulsating pressures of the respective pulsation chamber may be controlled so that they have a phase displacement which prevents an opening and closing phase from occurring at the same time, wherein the phase displacement is so controlled that it does not exceed a maximum phase displacement $F_{max}$, wherein $F_{max}=(t_d/T)*360°$ if $t_d<t_b$, and $F_{max}=(t_b/T)*360°$ if $t_b<t_d$.

These conditions may in an easy manner be derived mathematically, with the condition that said cycles have identical time periods, which only are phase displaced. Advantageously, the cyclically pulsating pressures of the respective pulsation chambers are controlled to be so close to said maximum phase displacement as possible, wherein said phase displacement is controlled to be at least greater than $F_{max}-20°$.

According to another advantageous embodiment of the invention, the pulsation frequency is controlled to be equal to or less than 200 cycles per minute. Thereby, the cyclically pulsating pressures of the respective pulsation chambers may be controlled to have a constant phase displacement in the interval 80°–100°. In this case, a phase displacement of 90° may be suitable. Thereby, no risk of said flow between the two teatcups arising occurs as long as the pulsation frequency is less than 200 cycles per minute. If the pulsation frequency is controlled to be between 200–400 cycles per minute, a constant phase displacement ought to be controlled to be in the interval 35°–55°, preferably the phase displacement 45° may be selected According to a preferred embodiment of the invention, the method is arranged to be performed when the first pressure level is an atmospheric pressure and when the second pressure level is a subpressure of about 50 kPa, i.e. normal pressure levels for milking machines.

According to another advantageous embodiment of the invention, the method is arranged to be performed during the initial massage period I which occurs before the main milking period II.

The invention is also related to a device for performing the method above. The device comprises control means, which are arranged to control the cyclically pulsating pressures according to the above-mentioned method. Thereby, the control means may comprise a control unit which by knowledge of the pulsation speed of the included cycles, i.e. time period and other features, influences the pulsator so that an opening phase does not occur at the same time as a closing phase of a pair of the teatcups. The control unit may be a calculating unit, which controls the cyclically pulsating pressure of the respective pulsation chambers so that they have a phase displacement which does not exceed a maximally calculated phase displacement $F_{max}$. The control unit may also be designed in a more simple manner so that it controls the cyclically pulsating pressures of the respective pulsation chambers to have a constant phase displacement within a pulsation frequency range. This constant phase displacement may be 90° at a pulsation frequency under 200 cycles per minute and 45° at a pulsation frequency between 200–400 cycles per minute.

Furthermore, said control means may be provided to perform said control during an initial massage period I which occurs before the main milking period II.

BRIEF DESCRIPTION OF THE DRAWINGS

In the following the invention is described by way of examples with reference to the attached drawings, in which.

DETAILED DESCRIPTION OF PREFERRED EMBODIMENTS OF THE INVENTION

Figure 1:
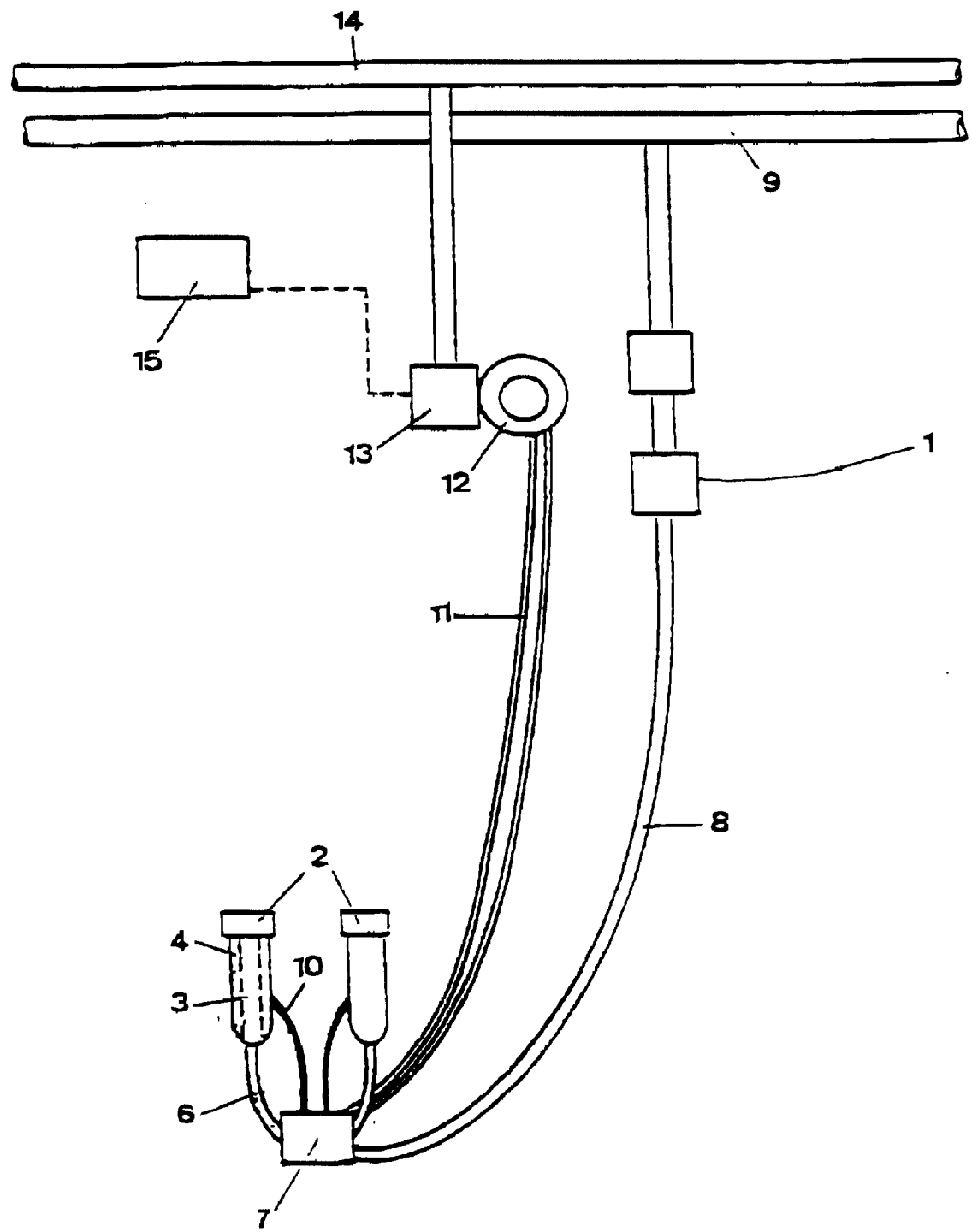
FIG. 1 shows a milking machine with a control unit according to the invention.

FIG. 1 shows a milking machine 1 with a pair of teatcups 2. It is to be noted that only one pair of teatcups is shown but the milking machine 1 may comprise several pairs of teatcups. Each teatcup 2 comprises a liner 3 for receiving a teat of an animal. The external surface of the liner 3 forms a pulsation chamber 4 with the internal surface of the teatcup 2. Each liner 3 comprises internally a milk guiding passage, which via short milk tubes 6 leads the milk to a milking claw 7. Thereafter, the milk is transported through a long milk tube 8 to a main milk pipeline 9. Short pulse tubes 10 connect the pulsation chambers 4 of the teatcups 2, via the milking claw 7 and long pulsation pipelines 11, to a pulsator 12. The pulsator 12 is arranged to alternatively reduce the pressure in the pulsation chambers 4 of a pair of teatcups. An adjustment device 13, which is arranged to adjust the pressure in the pulsator 12, is connected to a vacuum pipeline 14. According to the invention, a control unit 15 is provided to control the pulsator 12 so that a flow of milk between the two teatcups 2 is prevented.

Figure 2:
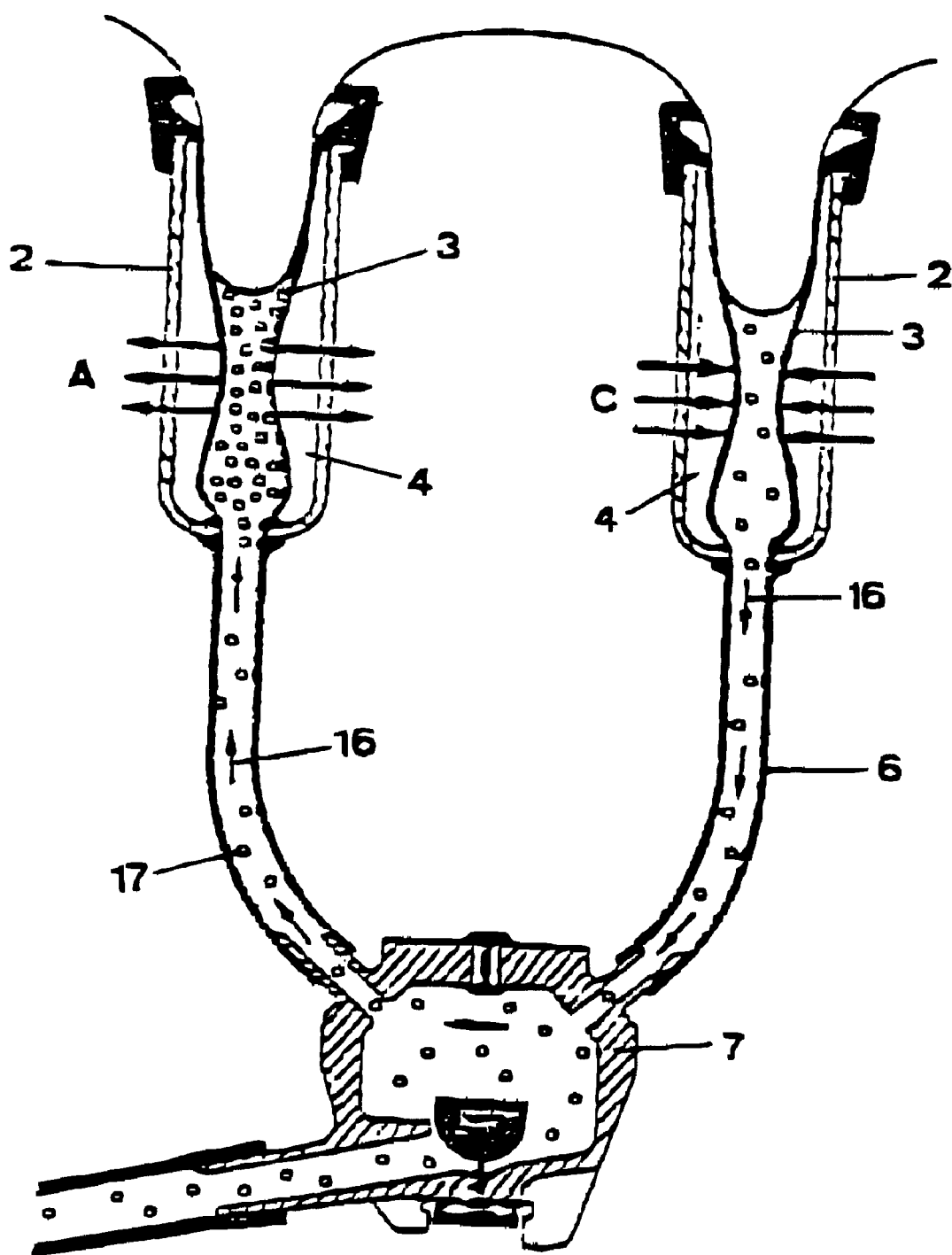
FIG. 2 shows how a flow of milk between two teatcups, so-called cross-flow, may occur.

From FIG. 2 it is evident how said flow between the two teatcups 2 in a pair may occur. By the fact that the pulsator 12 transfers a cyclically pulsating pressure to the respective pulsation chamber 4 of each teatcup 2, respective the liner 3 will perform an opening A and closing C motion when the pressure is changed in the pulsation chamber 4 between a first P1 and a second P2 pressure level. The liners 3 are internally, via the milk tube 6 and the milking claw 7, subjected to a subpressure, which usually is designated as a vacuum. The greatest risk of said flow of milk between the two teatcups 2 occurs when the liner 3 of one of the teatcups performs an opening motion A at the same time as the liner 3 of the other teatcup 2 performs a closing motion C. In FIG. 2, the liner 3 of the left teatcup 2 performs an opening motion A while the liner 3 of the right teatcup 2 performs a closing motion C. Thereby, the liner 3 which performs an opening motion A will expand its inner volume, wherein a temporary subpressure in relation to the pressure in the milking claw 7 is obtained. In a corresponding way, the liner 3 which performs a closing motion C will reduce its inner volume, wherein a temporary overpressure is obtained in this liner 3 in relation to the pressure in the milking claw 7. By this temporary pressure difference in the respective liners 3 an air stream may move from the liner 3 having the temporary overpressure to the liner 3 having the temporary subpressure. This air stream is marked with arrows 16 in FIG. 2. Thereby a risk occurs that milk, essentially in form of droplets 17, is sucked by the air stream. Such droplets 17 may obtain a very high speed, up to 12 m/s. Thereby, the milk droplets 17 may penetrate into the teat canals and result in infections of these if the milk contains bacteria. Thereby, an infected teat may easily infect another teat of the same animal.

Figure 3:
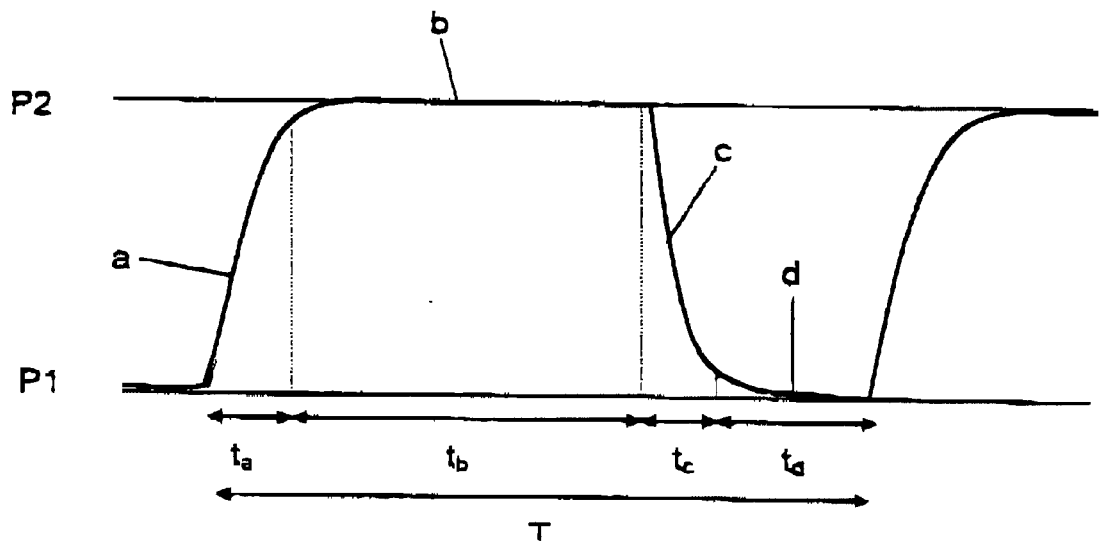
FIG. 3 shows a cycle with a pulsation pressure comprising four phases.

FIG. 3 shows a cycle of the cyclically pulsating pressure in the pulsation chamber 4. In the pulsation chamber 4 prevails initially a first pressure level P1 which usually is an essentially atmospheric pressure. During a first opening phase a, the pressure in the pulsation chamber 4 drops to a second pressure level P2, which may be a subpressure of the size of 50 kPa. This first phase a has a time period $t_a$. Thereafter, a second open phase b is initiated during which the pressure in the pulsation chamber 4 is essentially constant at the second pressure level P2 During this phase milk is extracted out of the teat. This phase b has a second time period $t_b$, Then a third closing phase c is initiated, during which the pressure in the pulsation chamber 4 rises from the second pressure level P2 to the first pressure level P1. The third phase c has a third time period $t_c$. Finally, the cycle has a fourth phase d, during which the pressure in the pulsation chamber is essentially constant at the first pressure level P1. The fourth closed phase d has a fourth time period $t_d$. The cycle has a total time period T which is the sum of the included time periods of the phases. The time period T is determined by the pulsation frequency of the pulsator 12.

Figure 4:
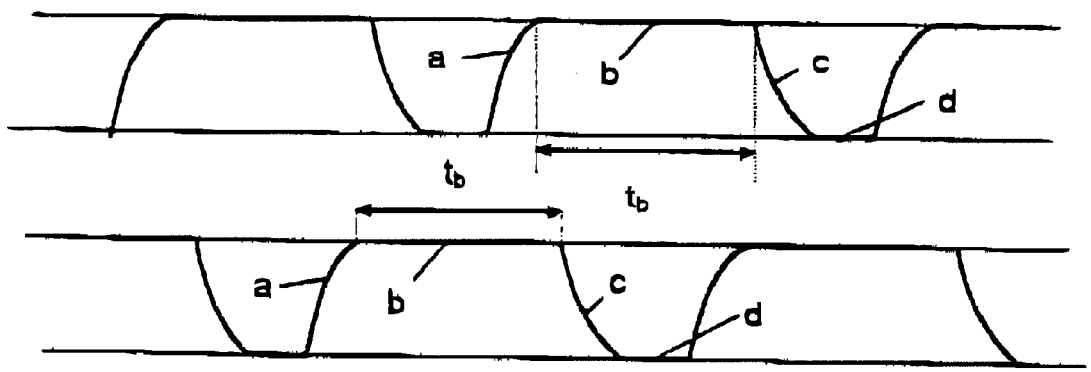
FIG. 4 shows two cycles with a phase displacement of 180° and a ratio of about 70:30.
Figure 5:
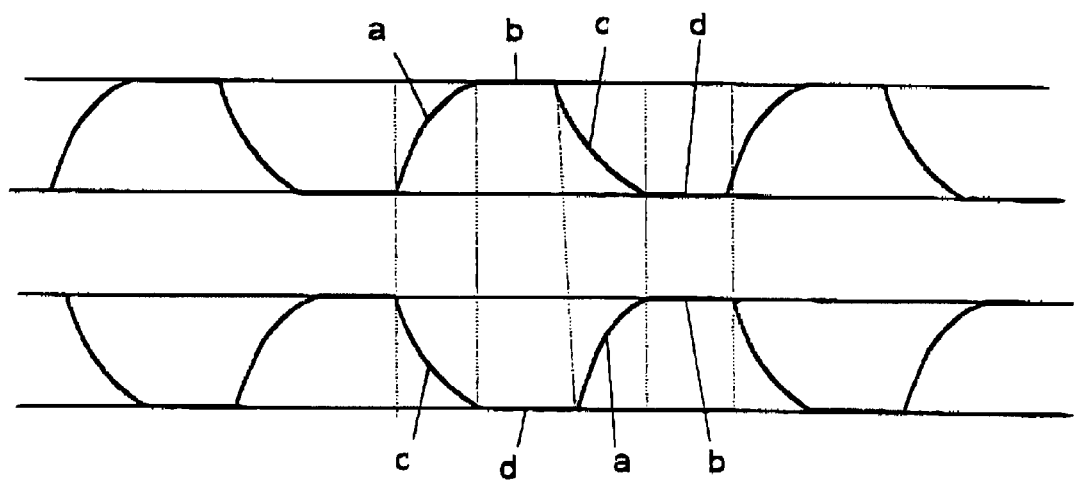
FIG. 5 shows two cycles with a phase displacement of 180° and a ratio of 50:50.

FIG. 4 shows how the cyclically pulsating pressure varies with the time for a pair of teatcups 2 by conventional milking during the main milking period I. The ratio between an open, and closed position of the liners 3 are in this case about 70:30. This ratio is calculated as the proportion between the opening phase a and the open phase b in proportion to the closing phase c and the closed phase d By a conventional milking method, said cycles are displaced 180° and have a pulsation frequency of about 60 cycles/min. The open phase b dominates here and by the fact that the cycles are displaced 180° any of the cycles of the pairs of teatcups will always have the phase b, i.e. the opening phase a and the closing phase c will by that reason never occur at the same time. As long as the time period $t_b$ for the open phase b is greater than the half time period T for the total cycle any of the cycles of the pair of teatcups will always have the phase b at the displacement of 180°. The corresponding argumentation is valid also for the closed phase d if it would have a greater time period than the open phase b. Usually, problem only arises when one wants to have a ratio about 50:50 or increase the pulsation frequency considerably because the time periods of the both phases b and d may then be less than the half time period d of the total cycle. FIG. 5 shows such an example with a ratio of 50:50. Such a ratio may be desirable during an initiating massage period I which occur before the main milking period II. In that case, it is not possible to keep a phase displacement of 180° between the cycles since an opening phase a of one of the cycles. will occur at the same time as a closing phase c of the other cycle. If the two cycles are identical with respect to the time periods of the included phases one may, for avoiding that an opening phase a and a closing phase c occur at the same time, derive a relationship with a maximum phase displacement $F_{max}$ between the cycles which is not to be exceeded, wherein $F_{max}$ is equal with $F_{max}=(t_d/T)*360°$ if $t_d<t_b$, and
$F_{max}=(t_b/T)*360°$ if $t_b<t_d$.

Figure 6:
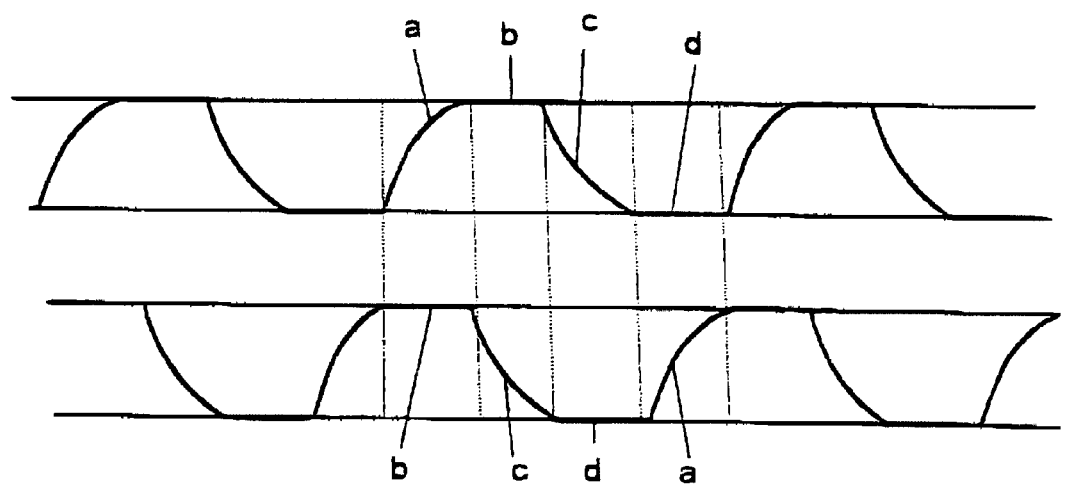
FIG. 6 shows two cycles with a phase displacement of 90° and a ratio of 50:50.

Thereby, the control unit 15 may be provided to control the phase displacement of the cycles so that this maximal phase displacement $F_{max}$ is not exceeded. This control may be calculating so that the phase displacement varies in response to the values of the included cycles, according to the formula above, or be constant within determined pulsation frequency ranges. FIG. 6 shows the cycles in FIG. 5 but with a phase displacement of 90°. As is visible, no opening phase a occurs here at the same time as a closing phase c of the respective cycles.

Certainly, the invention is not restricted to the described embodiments in the figures, but may be varied freely within the scope of the claims.

What is claimed is:

1. A method for milking an animal, by using a milking a machine, which comprises at least one pair of teatcups each comprising a liner for receiving a teat of the animal, wherein these liners internally are subjected to a subpressure for extracting milk from the respective teats and which comprises a pulsator arranged, via a pulsation chamber of each teatcup, to subject the liner of the teatcup to a cyclically pulsating pressure from the outside, including the step of subjecting the liner to a cycle of pulsating pressure with a time period T, wherein said cycle comprises:

a first opening phase, which has a first time period $t_a$ and during which the pressure in the pulsation chamber drops from a first pressure level to a second pressure level;

a second open phase, which has a second time period $t_b$ and during which the pressure in the pulsation chamber is substantially constant at the second pressure level;

a third closing phase, which has a third time period $t_c$ and during which the pressure in the pulsation chamber rises from the second pressure level to the first pressure level; and a fourth closed phase, which has a fourth time period $t_d$ and during which the pressure in the pulsation chamber is substantially constant at the first pressure level, wherein when both the second $t_b$ and fourth $t_d$ time periods are less than the half time period T for the total cycle, the cyclically pulsating pressures of the respective pulsation chambers are controlled in such a way that a flow of milk is prevented between the two teatcups of the respective pair.

2. A method according to claim 1, wherein said control comprises that the first phase of one of the teatcups does not occur at the same time as the third phase of the other teatcup.

3. A method according to claim 1, wherein said control comprises that said cycle of one of the teatcups is phase displaced in relation to said cycle of the other teatcup with a phase displacement, which is so controlled that it does not exceed a maximum phase displacement $F_{max}$, wherein $F_{max}=(t_d/T)*360°$ if $t_d<t_b$, and
$F_{max}=(t_b/T)*360°$ if $t_b<t_d$.

4. A method according to claim 3, wherein said control comprises that the phase displacement is greater than $F_{max}-10°$.

5. A method according to claim 1, including the step of operating the pulsator at a pulsation frequency, wherein the pulsation frequency is controlled to be equal with or less than 200 cycles per minutes.

6. A method according to claim 5, wherein said control comprises that said cycle of one of the teatcups is phase displaced in relation to said cycle of the other teatcup by a constant phase displacement in the interval 80°–100°.

7. A method according to claim 1, wherein the pulsation frequency is controlled to be between 300–400 cycles per minute.

8. A method according to claim 7, wherein said control comprises that said cycle of one of the teatcups is phase displaced in relation to said cycle of the other teatcup by a constant phase displacement in the interval 35°–55°.

9. A method according to claim 1, wherein the first pressure level is an atmospheric pressure.

10. A method according to claim 1, wherein the second pressure level is a subpressure of about 50 kPa.

11. A method according to claim 1, wherein a complete milking operation comprises at least an initial massage period and an main milking period, wherein said control is arranged to be performed during the initial massage period.

12. A device for milking an animal, comprising:

a milking machine having at least a pair of teatcups each comprising a liner for receiving a teat of the animal, wherein these liners internally are subjected to a subpressure for extracting milk from the respective teat;

a pulsator which is arranged, via a pulsation chamber of each teatcup, to subject the liner of the teatcup to a cyclically pulsating pressure from the outside, which pressure has a cycle with a time period T, wherein said cycle comprises, a first opening phase which has a first time period $t_a$ and during which the pressure in the pulsation chamber drops from a first pressure level to a second pressure level, a second open phase, which has a second time period $t_b$ and during which the pressure in the pulsation chamber is essentially constant at the second pressure level, a third closing phase, which has a third time period $t_c$ and during which the pressure in the pulsation chamber rises from the second pressure level to the first pressure level, a fourth closed phase, which has a fourth time period $t_d$ and during which the pressure in the pulsation chamber is essentially constant at the first pressure level; and a control which is arranged, when both the second $t_b$ and fourth $t_d$ time periods are less than the half time period T for the total cycle, to control the cyclically pulsating pressures of the respective pulsation chamber in such a way that a flow of milk between the two teatcups of the respective pair is prevented.

13. A device according to claim 12, wherein said control is arranged to perform said control in such a way that the first phase of one of the teatcups does not occur at the same time as the third phase of the other teatcup.

14. A device according to claim 13, wherein said control is arranged to perform said control in such a way that said cycle of one of the teatcups is phase displaced in relation to said cycle of the other teatcup by a phase displacement which is so controlled that it does not exceed a maximum phase displacement $F_{max}$, wherein $F_{max}=(t_d/T)*360°$ if $t_d<t_b$, and $F_{max}=(t_b/T)*360°$ if $t_b<t_d$.

15. A device according to claim 14, wherein said control is arranged to perform said control in such a way that said phase displacement is greater than $F_{max}-20°$.

16. A device according to claim 12, wherein a milking operation comprises at least an initial massage period and a main milking period, and wherein said control is arranged to perform said control during the initial massage period.

17. A method for milking an animal comprising the steps of:

providing a milking machine which includes at least one pair of teatcups, each of said teatcups including a liner having a milk guiding passage adapted for receiving the teat of an animal and a pulsation chamber;

providing a pulsator connected to the pulsation chamber;

subjecting the milk guiding passage within the liner to a vacuum to extract milk from the teats of the animal;

operating the pulsator to subject the liner of the teatcup to a cyclically pulsating pressure from the outside, which pressure has a cycle within a time period T having (a) a first opening phase having a time period $t_a$ during which the pressure in the pulsation chamber drops from a first pressure level to a second pressure level, (b) a second open phase having a time period $t_b$ during which the pressure in the pulsation chamber is substantially constant at the second pressure level, (c) a third closing phase which has a time period $t_c$ during which the pressure in the pulsation chamber rises from the second pressure level to the first pressure level, and (d) a fourth closed phase which has a fourth time period $t_d$ and during which the pressure in the pulsation chamber is substantially constant at the first pressure level, and controlling the cyclically pulsating pressures of the respective pulsation chambers of the teatcups to prevent a flow of milk between the two teatcups when both the second $t_b$ and fourth $t_d$ time periods are less than half of the time period T for the total cycle.

18. A method according to claim 17, wherein said controlling step includes preventing the first phase of one of the teatcups from occurring at the same time as the third phase of the other of the teatcups.

19. A method according to claim 17, wherein said controlling step includes displacing the cycle of one of the teatcups in relation to the cycle of the other of the teatcups to provide a phase displacement not exceeding a maximum phase displacement $F_{max}$, wherein $F_{max}=(t_d/T)*360°$ if $t_d<t_b$, and $F_{max}=(t_b/T)*360°$ if $t_b<t_d$.

20. A method according to claim 17, wherein the controlling step includes controlling the cycles to a frequency of less than or equal to 200 cycles per minute.

21. A method according to claim 17, wherein the controlling step includes controlling the cycles to a frequency of between 200 and 400 cycles per minute.

22. A method according to claim 17, wherein the second pressure level is a vacuum of about 50 kPa.

23. A method according to claim 17 wherein the milking of the animal includes an initial massage period and a main milking period, and wherein the controlling step is performed during the initial massage period.

* * * * *